United States Patent
Vizi et al.

(10) Patent No.: US 7,872,748 B2
(45) Date of Patent: Jan. 18, 2011

(54) REAL-TIME, 3D, NON-LINEAR MICROSCOPE MEASURING SYSTEM AND METHOD FOR APPLICATION OF THE SAME

(76) Inventors: Szilveszter E. Vizi, Hunyadlejtö u.32., Budapest H-1121 (HU); Róbert Szipöcs, Arany János u. 53., Szentkozmadombja H-8947 (HU); Balázs Rózsa, Teleki u. 12., Budapest H-1183 (HU); Pál Maák, Práter u. 52., Budapest H-1083 (HU); Júlia Fekete, Csiga út 4., Budapest H-1121 (HU); László Valenta, Templom u.3., Törökbálint H-2045 (HU); Gergely Katona, Népfürd u.21/c., Budapest H-1138 (HU); Péter Kalló, Mátyáshegyi köz 7., Budapest H-1037 (HU); Károly Osvay, Lomnici ú1., Szeged H-6270 (HU)

( * ) Notice: Subject to any disclaimer, the term of this patent is extended or adjusted under 35 U.S.C. 154(b) by 425 days.

(21) Appl. No.: 11/814,917

(22) PCT Filed: Jan. 27, 2006

(86) PCT No.: PCT/HU2006/000009
§ 371 (c)(1),
(2), (4) Date: Oct. 4, 2007

(87) PCT Pub. No.: WO2006/079861
PCT Pub. Date: Aug. 3, 2006

(65) Prior Publication Data
US 2008/0308730 A1    Dec. 18, 2008

(30) Foreign Application Priority Data
Jan. 27, 2005    (HU) ............................. 0500143

(51) Int. Cl.
*G01N 21/64*    (2006.01)
(52) U.S. Cl. .................... 356/318; 356/417; 250/458.1
(58) Field of Classification Search ............... 356/318, 356/417; 250/458.1
See application file for complete search history.

(56) References Cited

U.S. PATENT DOCUMENTS

| | | | |
|---|---|---|---|
| 5,034,613 A | 7/1991 | Denk et al. | |
| 5,659,642 A | 8/1997 | King et al. | |
| 5,713,364 A * | 2/1998 | DeBaryshe et al. | 600/476 |
| 5,995,281 A | 11/1999 | Simon et al. | |
| 6,411,835 B1 * | 6/2002 | Modell et al. | 600/407 |
| 2001/0029316 A1 | 10/2001 | Webb et al. | |
| 2002/0027202 A1 | 3/2002 | Engelhardt et al. | |
| 2003/0191397 A1 | 10/2003 | Webb | |

OTHER PUBLICATIONS

Denk et al., "Two-photon molecular excitation in laser-scanning microscopy," Handbook of Biological Confocal Microscopy, 1995, pp. 445-448, XP001040853, ISBN: 0-306-44826-2.

* cited by examiner

*Primary Examiner*—F. L Evans
(74) *Attorney, Agent, or Firm*—Birch, Stewart, Kolasch & Birch, LLP

(57) ABSTRACT

A real-time, 3D, non-linear microscope measuring system and method for examining a set of microscopic image points in different image planes. The system comprises a pulsed laser or parametric oscillator light source generating an examining optical signal, and is applicable to measure and/or photochemically stimulate pre-selected points within a short time interval. The system further comprises a bundle of fibers composed of optical fibers or other waveguides, a rapidly working optical switch, a imaging system, a light source and an optical system. The examining optical signal is a fluorescent or other optical signal imaged on the required spot.

43 Claims, 10 Drawing Sheets

| Z position (mm) | X position (mm) | Resolution (μm) |
|---|---|---|
| 0 | 0 | 0,6 |
| 0 | 1 | 0,6 |
| 0 | 3 | 0,6 |
| -5 | 3 | 1,6 |
| -5 | 0 | 1,2 |
| -10 | 3 | 0,9 |
| -10 | 0 | 0,6 |
| 5 | 3 | 1,0 |
| 5 | 0 | 1,0 |

REAL-TIME, 3D, NON-LINEAR MICROSCOPE MEASURING SYSTEM AND METHOD FOR APPLICATION OF THE SAME

This Application is the National Phase Under 35 U.S.C. §371 of PCT International Application No. PCT/HU2006/000009 which has an International filing date of Jan. 27, 2006, which claims priority to Hungarian Application No. HU P0500143 filed on Jan. 27, 2005. The entire contents of all applications listed above are hereby incorporated by reference.

The present invention relates to a real-time, non-linear microscope system applicable—both in in-vivo and in in-vitro applications—to make measurements and/or to perform photochemical stimulations in three-dimensional space (in a volume of at least 800 μm×800 μm×200 μm), at high speed (even with a resolution time of v>1 kHz), providing high spatial resolution characteristic of the scanning two-photon absorption fluorescence microscopy (appr. 0.6 μm×0.6 μm×1.8 μm), wherein the number of the measuring points is two or even more (typically more than 100).

The invention further relates to a method utilizing the above mentioned system for pharmacological examination of neuron networks where the effect of the pharmaceutical preparation to be examined is measured in an objective manner by examining the logical response function of the individual neurons or the activity pattern of the neuron network.

It is known that the neural network of the brain is made up of millions of rapidly functioning neurons. To understand this functioning it is indispensable to develop technologies which make simultaneous observation of the number of neurons or the number of compartments of the extremely complicated neurons (dendrite, cell body, axon, or dendritic spines, etc.) possible. The presently used multichannel examining methods do not provide for proper temporal and spatial resolution for studying the rather complex behaviour of neurons and their networks. There are two main methods for recording the cell activities: in electrophysiologic methods some electrodes are positioned in the vicinity of the cells or inside them, while in optical methods some kind of indicator is introduced into the cell and the optical characteristics of it is examined. These indicators may be sensitive to the concentration of ions, free radicals within the cell, to pH, to membrane potential, etc. As a result of these effects, in case of most indicators the intensity of fluorescence will vary, but in case of some indicators the spectrum will be offset or the lifetime of fluorescence is modified.

The most important electrophysiological method is the patch-clamp technology which is able to provide electric signals with high temporal resolution from full particulars from the internal part of full particulars from the internal part of a cell; however, it is adapted for examining only very few (generally merely 2-4) contiguous cells, since introducing of the electrodes into the cell is a slow, complicated process, which also harms the sample. During multichannel electric recording, a number of electrodes are inserted simultaneously into the tissue, in this manner electric signals coming from a larger area may be examined. The disadvantage of this method is that the signal provided by the electrodes is very simple, contains insufficient information, exact spatial positioning can not be guaranteed and application of them may cause extensive damage to the tissue.

With conventional CCD camera systems a great number of cells can be examined applying an image update time of several times 10 Hz depending on the resolution, however, this method can be used for taking pictures only in the upper, several times 10 μm region, because resolution, as a function of distance measured from the surface, connected deteriorates rapidly. On the other hand, because of the phototoxic damage resulting from the continuous excitation of a large area, the specimen gets ruined quickly and the fluorescent dye carrying the signal bleaches. For the time being the CCD camera systems are not suitable for examination of neural networks.

Confocal microscopes are fluorescent microscopes providing three-dimensional resolution. During their operation the excited fluorescent volume is imaged onto a point-like aperture by means of collimating optics providing satisfactorily high resolution, and a photodetector suitable for measuring the intensity of the fluorescence is placed behind this aperture. Only the fluorescent light which is produced at the point imaged exactly onto the aperture by means of the imaging system (e.g.: objective) is able to pass through this aperture with high-efficiency, in this manner the three-dimensional space can be scanned by moving the aperture. Confocal microscopes are widely used since they provide high resolution, their operating wavelength can be easily varied (by exchanging the filters), and they are relatively cheap.

Non-linear effects (e.g.: two- or multiphoton absorption, second-harmonic excitation, etc.) obtained during focusing the ultrashort-pulse (femtosecond) lasers can be used advantageously in 3D high resolution image generation as it is disclosed in the article titled "Two-photon laser scanning fluorescence microscopy" (Denk, W., J. H. Strickler, et al. Science 248(4951): 73-6, 1990). This method has been developed for examining biological specimens including neuron networks. In spite of the intensive research work of the last 15 years it is still unknown what logical operations the individual neurons perform during their activities, or how the logical functions describing them change upon external (non-synaptic) effects such as different drugs (alcohol, nicotine, etc.), natural or man-made pharmaceutical preparations. The main reason for this is that the image generating method developed by Denk and his team is based on continuous (point by point) scanning of image points (see: U.S. Pat. No. 5,034,613), therefore it takes a relatively long time (several minutes) to provide a satisfactory 3D image of the examined volume with submicron resolution. The operation of a conventional two-photon absorption fluorescence microscope is shown in FIG. 1.

The operation of the microscope is based on non-linear optical effect (e.g.: two- or multiphoton absorption, second-harmonic excitation, etc.) which is a second or higher order physical process in which the response function (e.g.: the two-photon absorption) is the second-order or high-order function of the light intensity. It is shown in FIG. 2 (see: photo) where the fluorescent dye is excited by light (in the present example blue) in a conventional single-photon manner. It can be seen that the dye is fluorescent (typically emitting green, yellow or red light) practically in the entire illuminated volume, which can be used for 3D image generation only by means of a suitable optical apparatus (see: confocal microscopy). If the light of the laser producing femtosecond pulses with satisfactorily high light intensity (operating in the red or infrared range) is focused into the dye (or the biological specimen treated with the dye) by means of a suitable microscope objective, excitation can be observed only in the immediate vicinity of the focal point (typically in a volume of a cubic micron or less). In this small volume the light intensity is so high that even two light quanta (photons) may be simultaneously absorbed in a dye molecule. The propability of such event is little, but it is proportional to the square of the intensity of the photons. To obtain a light intensity required for the non-linear microscope while the average output produced on the specimen does not exceed a threshold value which would cause destruction of the specimen, femtosecond lasers operating typically in the near infrared range are used for excitation of the specimen. In these lasers the laser pulses—typically having a duration of 0.1 ps—follow each other about every 10 ns, the energy of the individual laser pulses is typically between 1-10 nJ, so the average output of the laser is typically below 1 W. It is to be noticed that the use of dielectric mirror technology disclosed in U.S. Pat. No. 5,734,503 claimed by one of the present applicants Róbert Szipőcs et al. proved to be promotional in the development of femtosecond lasers and made practical use of dispersion compensated femtosecond laser oscillators possible.

In a conventional two-photon microscope (Denk, W. 1990, U.S. Pat. No. 5,034,613; FIG. 1) a light intensity which is high enough to excite the dye typically in the infrared range is produced at the focal point of the focused infrared laser pulse, as a result of which (within a few nanoseconds) it emits fluorescent light in the visible wavelength region of the spectrum. The intensity of this fluorescent light is measured using photoelectron multipliers tubes (PMT-s) or avalanche photodetectors (the exciting light is filtered out using wavelength-selective dichroic mirrors and colour filters). A fluorescent dye is used whose effective cross-section of absorption varies during the biological processes (indicator), e.g.: higher in the presence of calcium, in this way the stimuli running through the cell will produce increased fluorescent signal in the microscope. The degree of non-linear effect (e.g.: the extent of two-photon fluorescence) in case of a given light pulse energy depends on the pulse duration measured in the specimen and on the quality of spatial focusing. When the exciting pulses are satisfactorily short and focusing is correct, the dye is excited only in the small area neighbouring the focal point and having the shape of an ellipsoid of revolution. In this manner high-quality three-dimensional spatial resolution can be produced in the microscope.

It is to be noticed that because of the Fourier-transformation relationship between the temporal shape and frequency spectrum of the light pulse, the spectral bandwidth of the femtosecond lasers may be some nanometers, in some cases even several times 10 nm, which may cause significant change in temporal shape due to the dispersion taking place when passing through the optical elements (e.g.: the length of the laser pulse may be increased notably), resulting in significant decrease in the light intensity measured at the focal point, therefore in the fluorescent signal. Another important factor is that focusability of the laser beams is a function of the intensity distribution in the space perpendicular to the propagation of the laser beam, therefore in order to obtain satisfactory spatial submicron resolution during producing the image it is important to eliminate spatial distortion of the laser beam while the light from the laser reaches the biological specimen.

In the arrangement according to Denk (see: FIG. 1) two dimensional image can be produced with the scanning method, i.e. small exciting light spot is moved in the focal plane very rapidly by means of deflecting mirrors so scanning the specimen and an image of a given section of the cell is produced by means of a computer. Three-dimensional data may be gathered by using images taken in several different depths.

The advantages of the conventional two-photon scanning microscope compared to the confocal microscopes based on single-photon excitation which are applicable to generation of three-dimensional images are as follows:

Increased Penetration Depth

Since the extent of the dispersion and absorption loss is lower, the infrared light used for excitation is able to penetrate—with sufficient intensity—deeper into the tissue, therefore it is able to reach the healthier cells which are deeper, in this manner measurements can be made even in a depth of 800 μm (Helmchen, F., K. Svoboda, et al. (1999). "In vivo dendritic calcium dynamics in deep-layer cortical pyramidal neurons." Nat Neurosci 2(11):989-96.)

Small Exciting Spot

As a result of the high intensity dependence of absorption the resolution of the two-photon microscope is higher than the diffraction limit because fluorescence is produced only in a small region (typically <0.3 μm×0.3 μm×1 μm) surrounding the focal point, where the intensity exceeds a given threshold value. The size of this spot determines the resolution of the microscope through which even the structure of the so called dendritic spines may be examined. Besides, it is very important that excitation does not take place outside the focal spot, as a result of which a reduced background may be obtained and the phototoxic damage is minimized as it is apparent from the aforementioned document of Denk (1990).

Wide-Angle Detection

As opposed to the confocal microscopes where the fluorescent light is supposed to reach the detector through a satisfactorily small aperture (since the spatial position is selected through it), in the two-photon microscopes practically all of the fluorescent light may be detected even if it is dispersed in the tissue. Due to the more effective detection, lower light intensity may be sufficient for excitation, as a result of which the biological specimen is damaged to a lesser extent and the measuring time may be extended.

An image obtained using a conventional two-photon scanning microscope can be seen in FIG. 3 showing the reconstructed image of an interneuron treated with suitable fluorescent dye. In order to reconstruct the image, hundreds of two-dimensional images were taken in a plane perpendicular to the propagation direction of the light. A conventional two-photon scanning microscope designed and constructed by the present inventors was used for generating the image. The disadvantage of the conventional two-photon microscope is that the time required for generating the image (approx. 300 sec.) is orders of magnitude longer than the duration of the electric signal (transient) running through the individual neurons which is in the time domain of 1 ms.

There have been several proposals in order to solve this problem, that is to obtain higher scanning speed, still they do not meet the requirements as it is set forth hereinafter.

The greatest disadvantage of the confocal scanning microscopes utilizing a rotating (Nipkow) disk besides the inherent diasadvantages of the confocal microscopes mentioned earlier is that they require high light intensity and operate only in two dimensions. If by any chance by use of some kind of three-dimensional disk fast measuring of the individual points could take place, only a very short duration measuring time is possible because of the burdened specimen. (See e.g.: Tanaami, T., S. Outsuki, et al. (2002). "High-speed 1-frame/ms scanning confocal microscope with a microlens and Nipkow disks." Appl Opt 41(22): 4704-8.). Besides this, the presently existing solutions allow only a slow (a set-up transient of several ms) change of the image plane along Z-axis possible because it is done mechanically.

The acousto-optical (AO) two-photon deflector microscopes currently operate only in two dimensions (Iyer, V., B. E. Losavio, et al. (2003). "Compensation of spatial and temporal dispersion for acousto-optic multiphoton laser-scanning microscopy." J Biomed Opt 8(3): 460-71.), however, as it is shown in the present invention three-dimensional extension is possible with certain restrictions. Their disadvantage is that resolution required for scanning satisfactorily large areas (approx. 0.8 mm×0.8 mm) can be produced by using large-size crystals in which the acoustic grating producing Bragg reflection in the acousto-optical material by means of the piezoelectric transducer is formed very slowly. Another significant limiting factor is the angular dispersion produced on the Bragg grating which is difficult to compensate, thereby the shape of the focal spot is not satisfactory.

Another solution to the speed problem mentioned earlier may be the use of a wavefront converting element which is disclosed for example in patent application US 2004201885. However, electrically controllable wavefront converting element of this kind (e.g.: liquid crystal phase mask or deformable mirror) operating rapidly and reliably is not yet known.

A disadvantage of the two-photon scanning microscopes using parallel simultaneously scanning light sources is that the number of the photons detected is decreased, the signal-to noise ratio becomes worse due to the spatial filtering of the multichannel detectors necessarily appearing as a result of the parallel excitation. Another disadvantage is that they are able to make measurements only along a given geometric pattern (for example a row of points positioned along a line), so practically it can not be used advantageously in case of biological specimen.

A common disadvantage of the above systems is that despite the technical developments the time required for producing the 3D image is orders of magnitude longer than the duration of the electric signal (transient) running through the individual neurons which is in the time domain of 1 ms. To make measuring of the activity of the individual neurons possible "snapshots" should be taken which are able to describe the electric activity (potential) at the points which were identified earlier as inputs and outputs of neural "circuits" (e.g.: dendritic spines) within this time domain. But these points can be found at random places in the three-dimensional space therefore these patterns practically can not be examined using a conventional two-photon microscope. This is shown in FIG. 4 where the arrows point at the dendritic spines to be examined. The image was produced by using several two-dimensional photos taken in different depths and projected one onto the other.

The object of the present invention is to provide an optical apparatus which is applicable to collect the data (image elements or points) necessary for describing the activity of the neuron networks through subsequent addressing of the required image points (where the switching time between the individual image points is within a time domain of 10 ns-1 μs) practically at the same time (within the 1 ms time domain of the electric transient), while time is not wasted for measuring image points being unimportant from the viewpoint of activity. The inventors have realized that the points to be examined may be marked out optionally in the 3D volume under survey by proper positioning of the end points of a bundle of optical fibers consisting of n (2-100) optical fibers. The light emerging from the fibers is imaged into the specimen by means of a suitably constructed imaging system thereby providing exciting points which may be positioned optionally within the specimen.

A shortcoming of the presently used two-photon microscopes—concerning their applicability in research of neurons—that they can only used for real-time examination of the signals running on those cells or cell portions which are within the focal plane. To examine the arithmetic functions of the neurons and the activity of the neuron networks the following two conditions must be fulfilled:

(a) since the neurons and their extensions (axons, dendrits, etc.) as well as the dendritic spines—being the most characteristic points of connection between the cells—can be found at random places in the three-dimensional (3D) space, it must be guaranteed that measurements are made at selected points of a given volume;

(b) measurements must be made at all of the points within a time interval shorter than 1 ms, because during propagation of potential the response function of the neurons is accomplished within this interval.

In the presently used two-photon microscope systems several two dimensional planes must be scanned for correct three dimensional imaging of the specimen, therefore the time necessary for providing the required resolution is long (takes several minutes). The 3D two-photon microscope system according to the present invention is intended to solve this problem.

In the method according to the invention the 3D volume is reconstructed from the two-photon microscope 2D images obtained by scanning the different planes of the specimen in a conventional manner, and points well characterizing the neural activity are selected in the specimen for further measurements. These points are addressed individually by means of optical fibers and a imaging system, where the light is led in the individual points through separate optical fibers. This is shown for example in FIG. 5 where the points $P'(x_i,y_i,z_i)$ to be measured in the specimen are obtained through imaging the end points $P(x_i,y_i,z_i)$ of the optical fibers. During measurement the light is switched between the fibers in a predetermined order by means of a computer controlled optical (e.g.: acousto- or electro-optical) switch. At the points to be measured the laser pulses excite two-photon fluorescence having a emission wavelength different from the wavelength of the laser, in this manner the fluorescence signal can be separated from the excitation by means of a dichroic mirror.

In this conception the measurement of the points to be examined can be performed without mechanical motion. The picture points located in different planes can be examined orders of magnitude faster than with the existing systems (e.g.: the switching time in case of an acousto-optical switch is less than 10 μs), since the time needed for setting the objective (object platform) in a new focal plane (typically a few ms) as well as the setting time of the motors moving the mirrors which scan in the horizontal plane (x,y) can be saved.

Features and advantages of the present invention will become apparent from the following detailed description of preferred embodiments thereof taken in conjunction with the accompanying drawings in which.

Figure 1:
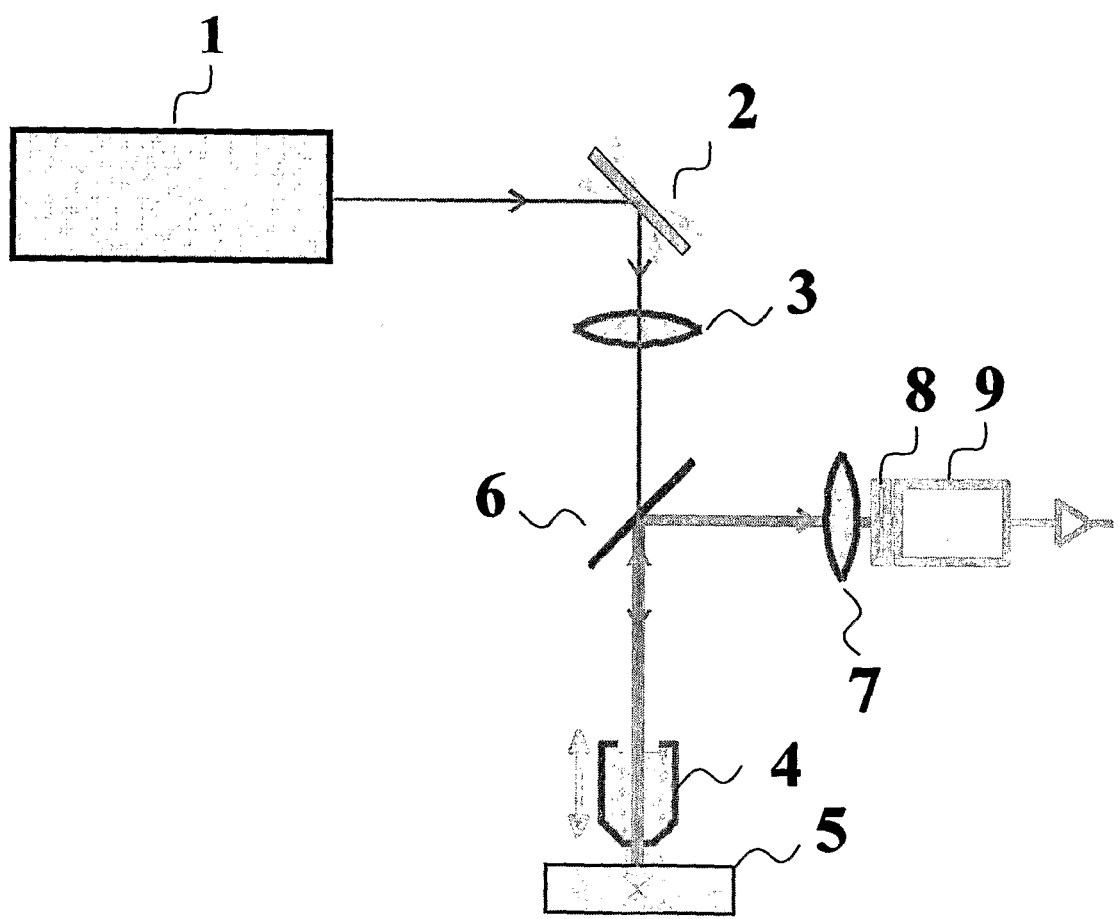
FIG. 1 shows the operation of the conventional two-photon absorption fluorescence microscope schematically.

FIG. 1 schematically shows the operation of the conventional two-photon absorption fluorescence microscope. Mirrors 2 operated by galvano-motors deflect the light of the mode-locked laser source 1. The deflected beam is imaged on the rear aperture of objective 4 by "scan-lens" 3. Objective 4 focuses the light into specimen 5 thereby produces the light intensity required for the two-photon excitation only in the focal point. The objective collects the fluorescent light which is then deflected from the path of excitation by dichroic mirror 6. The excited light is focused onto a photoelectron multiplier tube 9 by means of lens 7 through colour filter 8 and detected.

Figure 2A:
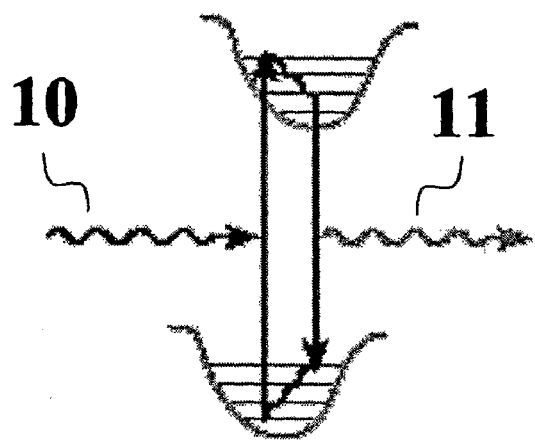
FIG. 2A shows the physical phenomena of the single-photon absorption fluorescence.
Figure 2B:
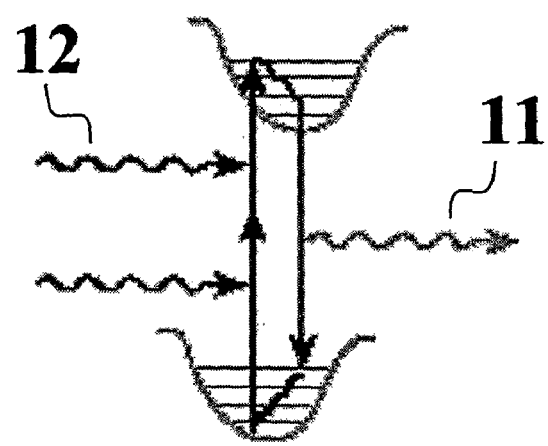
FIG. 2B shows the physical phenomena of the two-photon absorption fluorescence.

In FIG. 2 the physical phenomena of the single-photon absorption fluorescence of FIG. 2A is compared to the two-photon absorption fluorescence of FIG. 2B. For example in a case when laser light having a wavelength within the absorption band of a dye being in a cuvette is focused into a liquid containing the dye, then the single-photon excitation is produced along an entire light cone. When a mode-locked light having double wavelength is focused into the liquid producing two-photon excitation it excites only a small volume in the focal point. In FIG. 2A and FIG. 2B the energy diagrams of the corresponding excitations 10 and 12 are shown. The wavelength of fluorescence 11 produced during conventional excitation 10 is slightly longer. During two-photon excitation 12 the transition of the dye can be excited with photons having less (approximately the half) energy.

Figure 3:
FIG. 3 shows a 3D image of a neuron reconstructed from a series of 2D images obtained using a conventional scanning two-photon microscopy.
Figure 4:
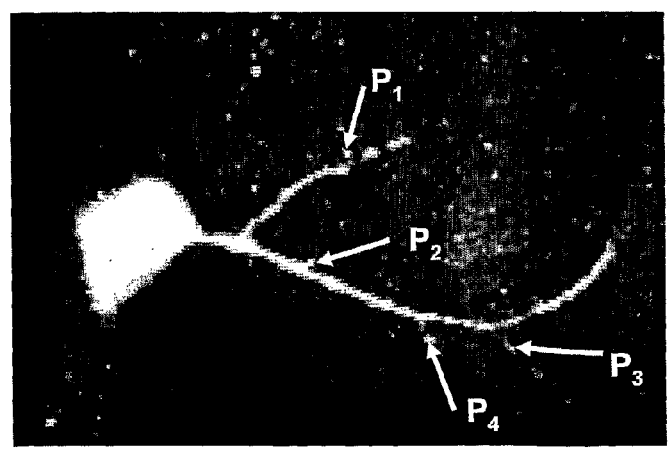
FIG. 4 shows a 3D image produced in a conventional manner and displayed on xy plane.

A 3D image of a spiny interneuron reconstructed from a series of 2D images obtained using a conventional scanning two-photon microscopy can be seen in FIG. 3. FIG. 4 shows a 3D image produced in a conventional manner and displayed on xy plane. The dendritic spines P to be examined are marked by arrows. Naturally, these dendritic spines P can be found in different depths.

Figure 5:
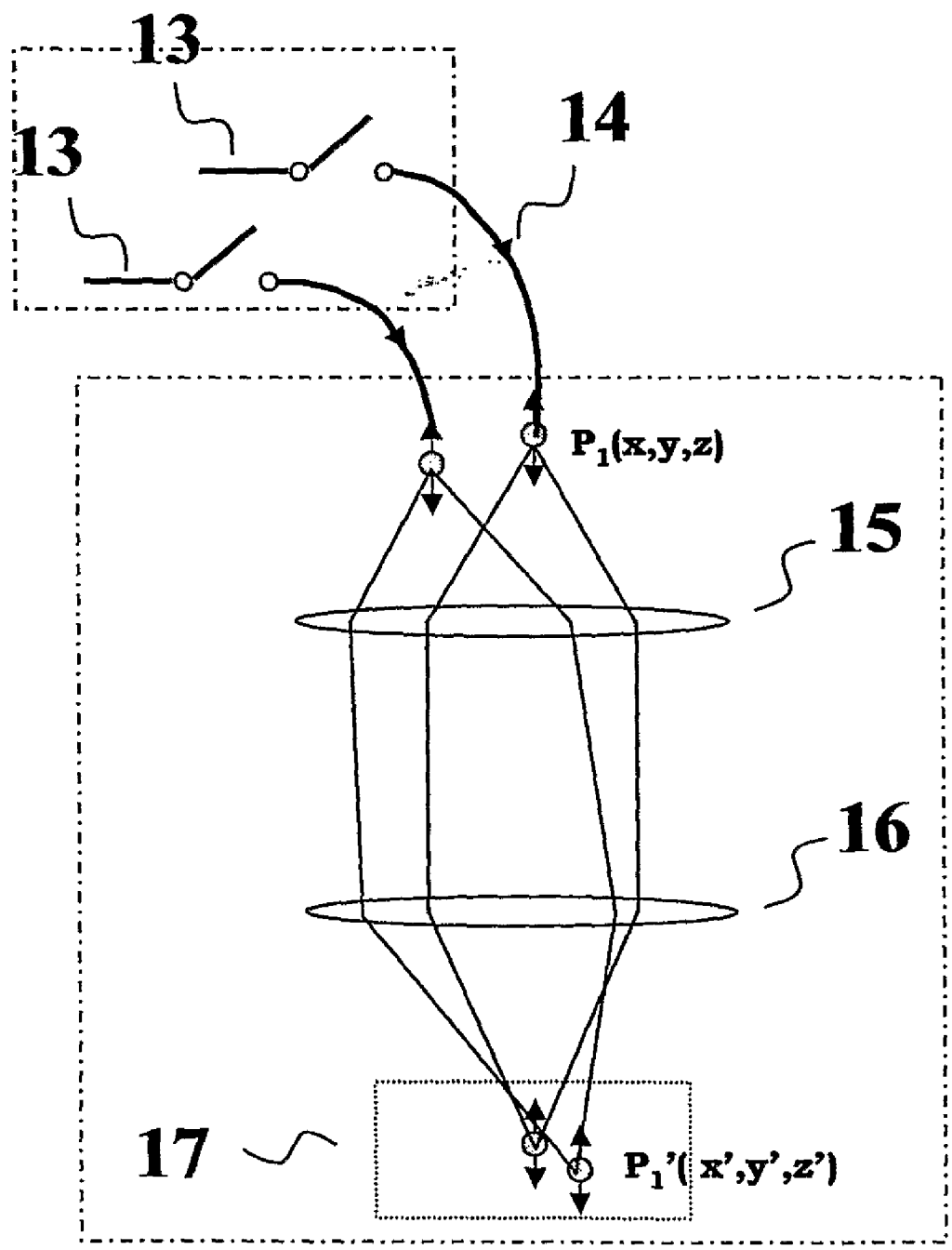
FIG. 5 is a diagrammatic illustration of the basic idea of the present invention.

FIG. 5 is a diagrammatic illustration of the basic idea of the present invention. By means of the light-switching device(s) 13 it becomes possible to introduce the exciting light to the respective optical fiber 14 within a switching time of microseconds. The end points of the optical fibers are imaged into the specimen 17 by means of afocal imaging system 15, 16 comprising, e.g., two objectives (or lenses).

Figure 6:
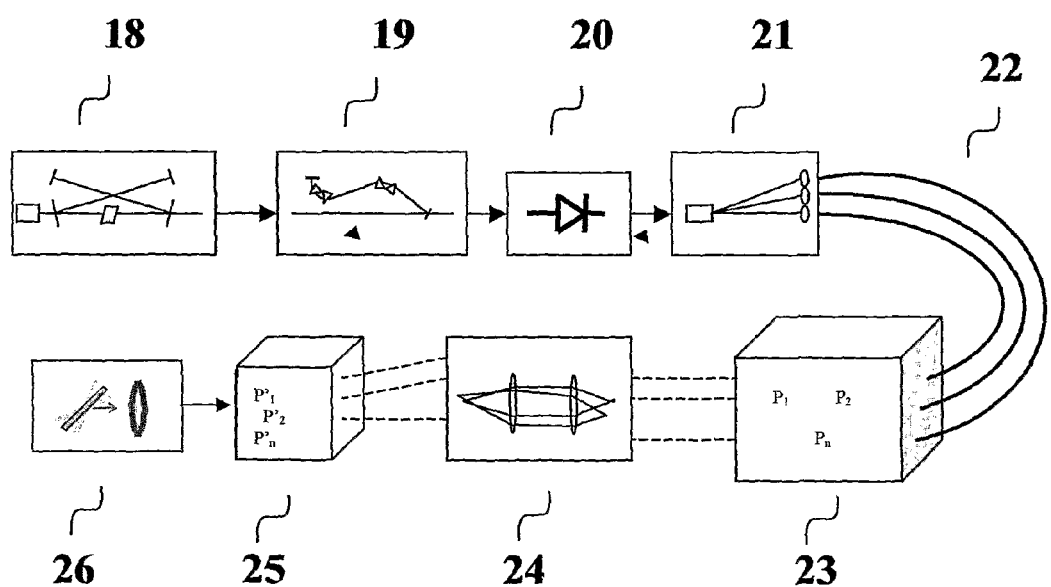
FIG. 6 is a block diagram showing the structure of an exemplary embodiment of the invention.
Figure 7:
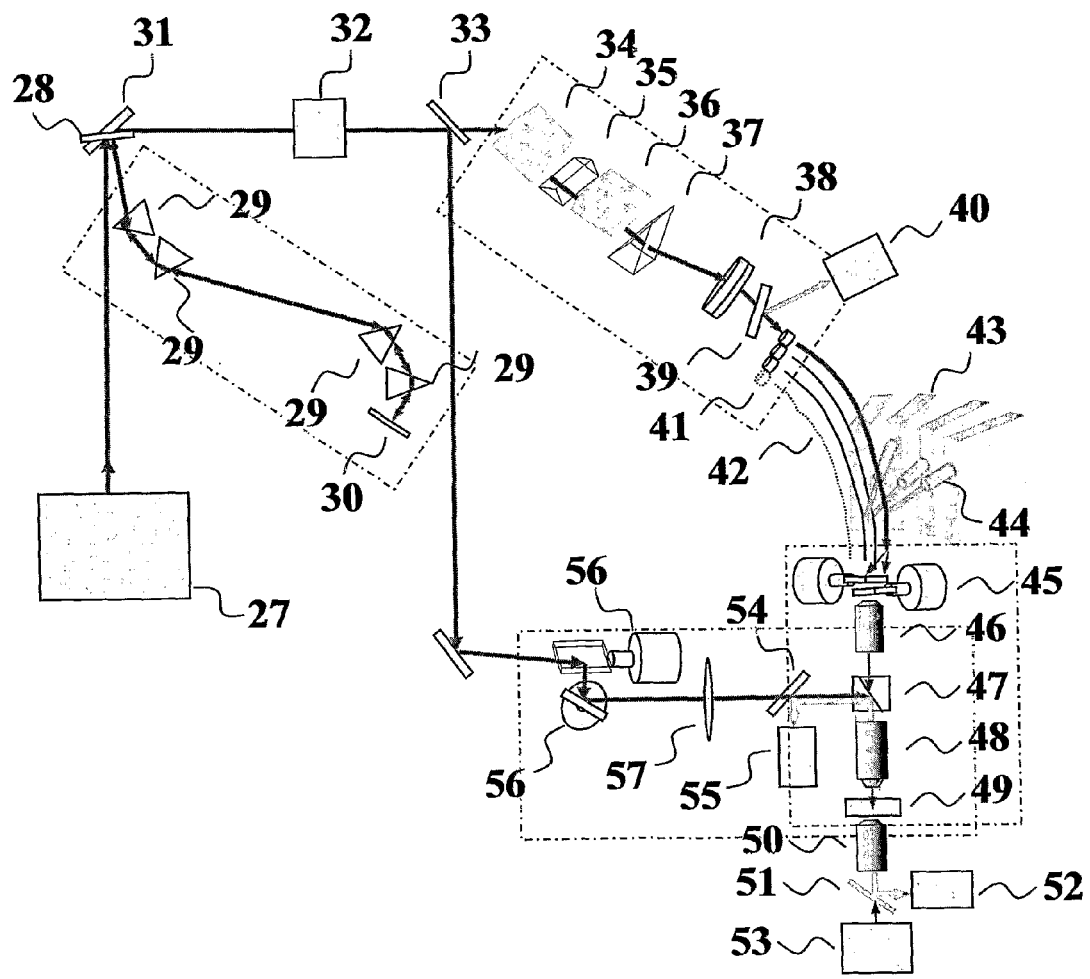
FIG. 7 shows an arrangement for an exemplary embodiment of the invention.

In FIG. 7 an exemplary embodiment of the invention (already tested in practice) is shown which is meant to be illustrative only and not limiting the scope of the invention. Further, the general conception of the invention can readily be understood with reference to FIG. 6.

A block diagram showing the structure of an exemplary embodiment of the invention can be seen in FIG. 6. Here, the mode-synchronized light source is a titanium-sapphire laser 18. The light emerging from this light source is directed on a P&W four-prism system 19 by means of which the pulses are temporally stretched in order to minimize the non-linear effects arising later in the glass fibers. To eliminate the interfering effects of the reflections a Faraday-isolator 20 is placed in the light path. Light is introduced to optical fibers 22 by means of rapidly working light switching and coupling system 21 (acousto-optical deflector in the present example). The other ends of the fibers are set in the required position with an accuracy of less than a micrometer by means of a manipulator system 23. The imaging system 24 maps the ends of the optical fibers into specimen 25. This optical system contains a highly dispersive element necessary for recompression of the pulses. An overall image of the specimen may be obtained by means of a conventional "reference scanner" 26.

The control electronics necessary for operating the system and the software can not be seen in the exemplary embodiment shown in FIG. 7. The light of Ti:S laser 27 is directed into P&W four-prism system by mirror 28 where the dispersive features of the pulses can be set as the light passes through the four prisms 29, then being reflected back by an end-mirror 30 it travels again through them. Then light is directed through mirror 31 which is slightly offset in the vertical direction and through Faraday-isolator 32 into light-switching and coupling system 33. The beam is deflected by acousto-optical cells 34, 36 whose angular dispersion is compensated by using prisms 35, 37. The deflected beam is imaged on input lenses 41 by means of a doublet lens 38. For positioning the other ends of optical fibers 42 thinned supporting arms 44 are used which are connected to a manipulator system 43 providing sub-micrometer resolution. The light emerging at the ends of the fibers is perturbated by means of a beam offset scanner 45. Then a imaging system containing two objectives 46, 48 is positioned in the light path. Between the two objectives a ZnSe beam splitter cube 47 is placed which acts as a polarizing or dichroic beam splitter. The fluorescent light excited by the laser light focused in specimen 49 can be detected at three places: a lower detector 52 detects the fluorescent light collected by condenser 50 positioned under the specimen, an upper detector 55 detects the light reflected back to the reference path through beam splitter cube 47 and deflected by dichroic mirror 54, finally a "confocal" detector 40 detects the fluorescent light led back in the fibers and deflected by a third dichroic mirror 39. Preferably, after pulse shaping, the light is introduced to the reference scanner branch by means of a tilting mirror 31 or a beam splitter 33. The reference branch contains conventional two-photon microscope optical elements: scanning mirrors 56 and scan-lens 57. To make operation of the present system possible in the conventional IR (or visible) microscope mode a lamp 53 (which necessitates installation of dichroic mirror 51 for the lower detector) and a camera which can be pushed into the light introduced to the reference branch are needed.

Measurements start with scanning a number of 2D planes of the specimen using a conventional laser scanning microscope (hereinafter called reference scanner 26), from which a portion of a 3D space is reconstructed in the specimen. The points to be examined are selected according to this image then the outputs of the optical fibers are set (micro-positioning) so that the light emerging at the ends of the fibers is imaged exactly on the selected points by means of the a imaging system. Then measurements are made only in these regions carrying the biologically relevant information.

During micro-positioning the coordinates of the ends of the optical fibers 23 $P(x_i, y_i, z_i)$ are adjusted—on the basis of pre-calibration—to coordinates of the points in the specimen 25 $P'(x_i', y_i', z_i')$ so that the light cone emerging from the fiber is focused exactly onto point P' ($n \geq i \geq 1$). The focal plane can be adjusted (z-scan) by moving the optical fiber practically parallel with the optical main axis, while scanning the planes perpendicular to the optical axis is done by moving the end of the optical fiber in the plane perpendicular to the main axis (x,y).

In this arrangement a conventional single mode optical fiber 22 was used. The single mode fiber guarantees that the (approximately Gauss-function shaped) transversal distribution $TEM_{00}$ of the laser beam used for measurement does not change during propagation. However, the material dispersion of the fiber and the non-linear effects (e.g.: self-phase modulation) produced in the fiber may result in significant changes in the temporal shape of the femtosecond laser pulses used in two-photon microscopy. It is important in case of laser pulses having a width of short duration, that is, in case of pulses having broad bandwidth due to the Fourier-transformation relation. In non-linear microscopy pulses of the same kind are needed, since these pulses have high peak-intensity (high energy density) while the average output is low, thereby the specimen is damaged in a lesser extent. However, the pulse bandwidth is limited by the absorptive bandwidth (generally a few times 10 nm) of the fluorescent molecules which must be taken into consideration when selecting the dye and the bandwidth of the laser.

The non-linear effects may be reduced to a minimum in case of conventional single mode optical fibers by using chirped pulse amplification CPA which method proved to be advantageous in amplification of "chirped" pulses. The essence of it is that the short laser pulses are stretched when starting the system, then after their propagation through the optical fibers they are compressed again, thereby the non-linear effect inducing change of the pulse spectrum in the optical fibers is negligible because of the low energy density. Stretching of the pulses can be obtained by high second-order dispersion, and approximately the same amount of dispersion of opposite sign is used for compression. High negative second order dispersion is obtained by means of a Proctor&Wise arrangement 19 containing four prisms. This arrangement is also adapted for keeping the third order dispersion on low level which is important, because the high third-order dispersion results in significant distortion in the time shape of the pulse which can not be corrected after propagating through the fiber. Since the Proctor&Wise arrangement requires large space, it can not be installed in the imagingimaging system after the fiber, therefore negative dispersion is applied before the fiber, then pulse compression is performed after the fiber by means of a ZnSe crystal 24 having high material dispersion and built in the imagingimaging system. (Further functions of the ZnSe crystal will be described later.) It is due to this that the beam focused in the specimen contains laser pulses having high energy density both in time and space which is essential for non-linear (two-photon absorption) excitation.

In an alternative solution the conventional single mode optical fibers may be replaced by photonic crystal fibers (PCF-s). In this case there is no need for stretching and recompressing the pulses as described in the foregoing, so instead of the Proctor&Wise arrangement a two-prism arrangement may be used in the system to compensate the low-level positive dispersion being still present in the system. Further, the high positive dispersive ZnSe crystal may be omitted. This is important because obtaining high positive dispersion may be disadvantageous in terms of the absorption of the crystal in the visible light region, in consequence of which the number of the detected photons is decreased. When photonic crystal fiber is used the prism may be replaced by a conventional beam splitter cube having high transmission efficiency also in the visible range.

An advantageous arrangement according to the invention is shown in FIG. 7, but practically several alternatives have been worked out for a similar arrangement, the difference lies in the beam splitters and the deflecting mirrors used. In one of the two essentially different systems, the highly dispersive ZnSe crystal behaves as a dichroic distributor, while in the other it behaves as a polarizing beam splitter cube. Hereinafter the operation of the first system will be disclosed, while the latter will be described as "Polarizing version" later.

The pulses emerging from a titanium-sapphire laser oscillator functioning as laser light source 27 can basically be transmitted on two paths. The path suitable for the application can be selected by means of a tilting mirror 31, or light may be transmitted into both branches at the same time by means of a beam splitter 33. One of the paths is the conventional laser scanning two-photon microscope path called "reference scanner path", the other is the so called "real-time, random addressed two-photon microscope path".

In the "real-time, random addressed two-photon microscope path" the pulses emerging from laser 27 first pass through a Proctor&Wise-type four-prism system 29, 30, whose dispersion is approximately $GDD=-15\,000\,fs^2$. At the end of this system an end-mirror 30 reflects the light back through the four prisms 29 so that a few millimeter divergence in the vertical direction is provided between the beams passing back and forth. In this manner the reflected beam is further reflected by mirror 31 positioned slightly higher than the input beam. The mode synchronized state of the laser can be stopped by incidental reflections, that is why the beam is transmitted through a Faraday-isolator 32.

Then pulses travel to optical switches 34, 36. Addressing of the optical fibers in x and y directions controlled by a computer are performed by these rapidly working optical switches 34, 36 (electro-optical or acousto-optical deflectors). In the arrangement according to the invention acousto-optical deflector (AO) is used the switching time of which between two points having different x,y coordinates is typically at around 1 µs. This acousto-optical deflector contains two $TeO_2$ crystals having piezoelectric features. When high-frequency alternating potential is coupled to the crystals an acoustic wave is produced in them which functions as an optical grating and deflects the laser beam. Angular dispersion compensating elements 35, 37 made of SF11 glass are placed following the optical switching elements (possibly after each). These elements 35, 37 restore the quality of the beams and make their introduction to the optical fibers possible. The laser light is then introduced to optical fibers 42. The light deflected by the AO is directed by means of a doublet lens 38 (which is free from spherical and chromatic aberration) into optical fibers arranged in a matrix form. Introduction is carried out by means of lens-matrix 41 or even by means of a single input lens.

After positioning the ends of the optical fibers with micrometer accuracy they are imaged onto the specimen by means of a imaging system 46, 48 where the ratio of scaling down is 10:1. Positioning is carried out by means of a computer controlled micro-positioning mechanism 43, 44 (shown schematically in the FIG. 11.), on the basis of the image produced by the reference scanner. Precise positioning is facilitated by the resilient wires according to the invention. The cost of production can also be decreased by using these resilient wires because accuracy of the individual manipulators and the linearity of motions are not requirements since absolute positions of the manipulators can be calibrated later. The diameter of the wires can be of the same order of magnitude as the diameter of the optical fibers.

The 10:1 scaled-down imaging has two important advantages: (a) The core diameter of the fibers providing single mode Gaussian intensity distribution suitable for two-photon excitement is typically between 5-10 µm at wavelengths of about 800 nm, that is, in order to obtain an ideally small exciting spot this value must be decreased below 800 nm by means of a telescope. (b) This makes possible to realize the exciting spots selected in the specimen through positioning the optical fibers mechanically in the object volume. Addressing of the points being close to each other may present a problem because the optical fibers can not be placed very close to each other in the object volume of imaging because of their physical size. To overcome this difficulty two plane-parallel glass plates 45 inserted behind the fibers or a mirror the inclination angle of which is adjustable may be used. In this case the images of the optical fibers are offset programmably in the specimen. When scanning is properly synchronized with the switching of the exciting light transmitted through the fibers, scanning of the "dead spaces" between the fibers becomes possible. In addition, kinetic artifacts of the specimen may be monitored and eliminated by this means. Preferably, the end portion of the arms holding the fibers are thinned down. In this manner the arms will not collide with the fibers and one another or the beams emerging from the fibers with NA of approx. 0.1. Advantageously, the end portions of the arms are made of glass fiber and the two fibers are fixed to each other in the shape of a T. Defects deriving from elastic deflection of the arms may be eliminated during the aforementioned calibration.

Typically, the telescope imaging system contains a number of lenses, such as collimating objective 46 and focusing objective 48. There is a free optical path between them in which the high positive dispersive material (ZnSe crystal 47) used for compressing the pulses may be placed. At the same time this ZnSe crystal 47 functions as a beam splitter cube containing two oppositely placed rectangular prisms with a dichroic mirror layer applied between them. Exciting pulse arriving from the fibers pass through the beam splitter cube without being affected, and the diffuse radiation arising in a small amount in the specimen 49 also passes through it on the way back, but because of its different wavelength the fluorescence signal generated in the specimen 49 is reflected back by the dichroic mirror.

During biological measurements in the cells filled up with fluorescent molecules the two-photon absorption raising fluorescence is produced at the highly focused points excited by femtosecond pulses. For focusing and effective gathering of the fluorescent photons an objective with a numeric aperture NA=0.8 is used in order to have the possible smallest space angle where the photons may get lost. For this reason an objective 50 and a photoelectron multiplier 52 onto which the light is transmitted by means of a dichroic mirror 51 are placed under the specimen. It is preferred to use a colour filter glass positioned before the photoelectron multiplier 52. The other portion of the fluorescence signal emerging from the specimen travels backwards, towards the upper objective. Passing through the first objective 48 it reaches the ZnSe beam splitter cube 47, and the dichroic mirror deflects it by 90°, then by means of dichroic mirror 54 being present in the reference scanner branch 57-54, 47-49 it is directed to photoelectron multiplier 55 for detection.

Now the reference scanner path will be described. This measuring mode of operation is necessary for getting an overall image of the specimen in order to recognize and set the target points of the real-time measuring. When running it simultaneously with the real-time measurements, displacement of the specimen can be monitored.

Laser pulses emerging from laser oscillator 27 are deflected from "real-time, random addressed two-photon microscope branch" by tilting mirror 33 positioned after Poctor&Wise arrangement 29-30 and Faraday-isolator 32. For 2D scanning of the specimen two mirrors 56 are used which are moved by means of galvano-motors rotating around axes being perpendicular to each other. By means of a telescope lens system the mirrors are imaged onto the input aperture of the objective 48 being focused on the specimen. To this a ZnSe beam splitter cube 47 providing high reflection in two-photon excitation spectrum and low reflection in fluorescence spectrum is needed. Then the distributing block 47 reflects the exciting light onto the specimen, then the generated fluorescence is detected partly by photoelectron multiplier tube 50, and partly it is directed back from focusing objective 48 to beam splitter 47 and passes through it. In this manner the signal travels through fibers 42 and is reflected onto photoelectron multiplier 40 by means of dichroic mirror 39 positioned before fibers 42.

Preferably, instead of ZnSe beam splitter cube 47 used in the reference scanner branch, the ZnSe distributing block of the "real-time branch" is replaced by a simple dichroic mirror 47, but in this case instead of using the tilting mirror 33 placed after the Faraday-isolator 32, a tilting mirror must be placed before the Proctor&Wise arrangement for leading the laser light into the reference branch. Then it is preferable to place a further Faraday-isolator in the reference branch. The reason for transfer of the tilting mirror is that pulses may only be stretched through the Proctor&Wise arrangement if they are compressed again before the specimen by applying high positive dispersion.

Further, under the specimen 49, below dichroic mirror 51, an IR lamp 53 is positioned. The light from specimen illuminated by the IR lamp passes through objective 48 and is reflected by dichroic mirror 47 onto dichroic mirror 54 in the reference path, then it is directed to a CCD camera temporarily used for detection instead of photoelectron multiplier 55. This image is instrumental in positioning the patch-pipette used for filling up the biological specimen with fluorescent dye and in puncturing the cell, since larger cells are distinctly visible in the IR image and movement of the pipette can be traced.

For setting the medium plane of 3D scanning and for performing the depth scanning by the 2D reference scanner the lower objective 48 is adjusted by means of a piezo actuator having a few 100 μm range of movement. For rough adjustment it is easier to move the specimen (and the lower detector system), but the bulky upper part may be also moved.

In case of the so called "Polarizing version" the arrangement used during experiments is similar to the arrangement applying dichroic mirrors. This time, instead of dicroic mirror layer a polarizing mirror is placed in between the two halves of the ZnSe distributing block 47, which reflects the horizontally polarized light and transmits the vertically polarized light.

The pulses emerging from the laser are horizontally polarized, and after passing through the Faraday-isolator 32 placed behind the Proctor&Wise arrangement they become vertically polarized. Instead of tilting mirror 33 a polarizing beam splitter cube is used through which the vertically polarized light travels into the "real-time, random addressed branch" and the horizontally polarized light is reflected into the reference path. In the "real-time, random addressed path" the pulses reach the specimen without their polarization being changed, but in the reference branch 57-54 polarization must be turned over in order to provide horizontal polarization at the ZnSe beam splitter cube 47, since the pair of mirrors 56 used for scanning turns the polarization by 90°. The required polarization turn-over is produced by means of λ/2 plate used before scanning. Fluorescence arising in the specimen is of random polarized, at this time the signal can be detected at each of the three photoelectron multipliers 52,55,40, but in any case, the colour filter glasses must be used for filtering the exciting light out.

Figure 8A:
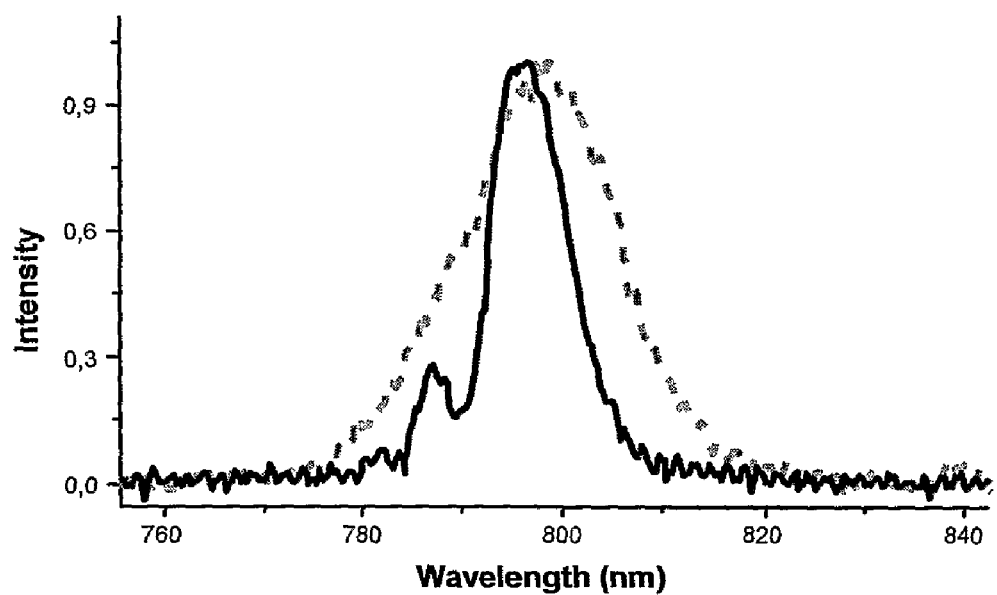
FIG. 8A shows the measured spectrum of the pulses as compared to the initial spectrum of the pulses emerging from the laser.
Figure 8B:
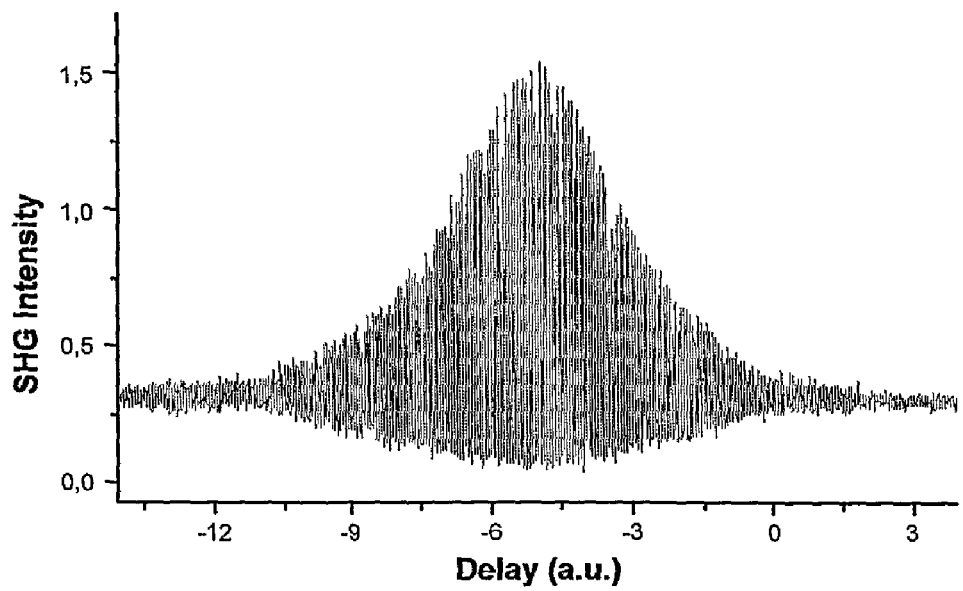
FIG. 8B shows the measured second-order interferometric autocorrelation traces of the optical pulses at the exit of the optical fiber.

Spatial and temporal parameters of the system has been verified by measurements. For temporal parameters the spectrum and the interferometric auto-correlation function have been measured at the input of the preferred microscope system (at the laser output) and at the end of the imagingimaging system. At the input the spectrum was approx. 20 nm wide with a centre wavelength of 795 nm. As a result of the non-linear effects arising during propagation in the fiber and the negative chirp, a reduced spectral width was measured at the output, the half-width value depends on the energy transmitted through the system. In FIGS. 8A and 8B the spectrum measured at the titanium-sapphire laser and at the output in case of a transmitted power of 40 mW can be seen. In order to estimate the width of the time-shape and the chirp the interferometric auto-correlation function of the pulses has been measured. As it can be seen in FIGS. 8A and 8B, it resulted in a chirped pulse having a half-width value of approximately 50 fs at the start, and a slightly chirped pulse (less than 100 fs) at the output. The upper diagram of FIG. 8A shows the spectrum of the pulses measured (at an average power of 22 mW) at the outputs of the optical fibers before they are focused into the specimen (continuous line) as compared to the spectrum of the pulses emerging from the laser (broken line). It can be seen that the spectrum is well maintained even with this relatively high power. The lower diagram of FIG. 8B shows the interferometric auto-correlation function measured at the output for estimating the temporal width of the pulses.

By means of photonic crystal optical fibers shape preserving transmission of 150 fs pulses with GDD≈1000 fs$^2$ has been realized in case of energies of approx. 0.5 nJ, which is also applicable to non-linear microscopy measurements.

In the single-channel prototype according to the invention the characteristics of the imaging system with two objectives forming the core of the apparatus have been examined. The mode-synchronized laser light was introduced to a single-mode optical fiber, the end of the fiber was moved above the objective system by means of high-resolution motorized manipulators, and the two-photon excited light was measured in the fluorescent beads which were used as specimen. The results of the measurements are shown in FIGS. 9, 10A and 10B, where the resolution deteriorating effects caused by deviation from the optical axis and the focal plane were examined during image forming.

Figure 9:
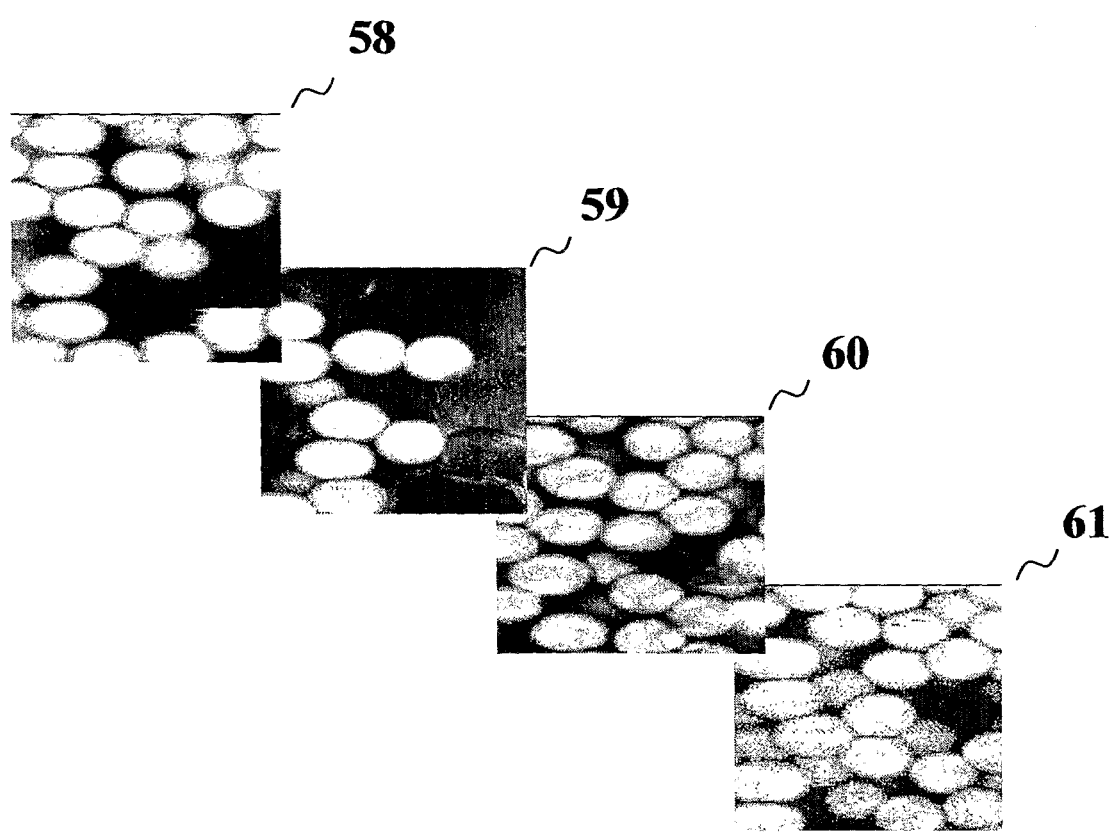
FIG. 9 shows illustrative images for operation of 3D scanning.

FIG. 9 is a representative example showing the operation of the 3D scanning. In the single-channel prototype, images 58-61 of the specimen were taken in different depths by positioning the fibers (z=0, 5, 10, 15 mm). In this case the specimen consisted of fluorescent beads having a diameter of 10 μm. As a result of the 1:10 imaging the positions in the specimen were: $z_2$=0, 50, 100, 150 μm. The experiment demonstrates it well that position selection, scanning with the optical fibers becomes possible even with unchanged objective position.

Figures 10A, 10B:
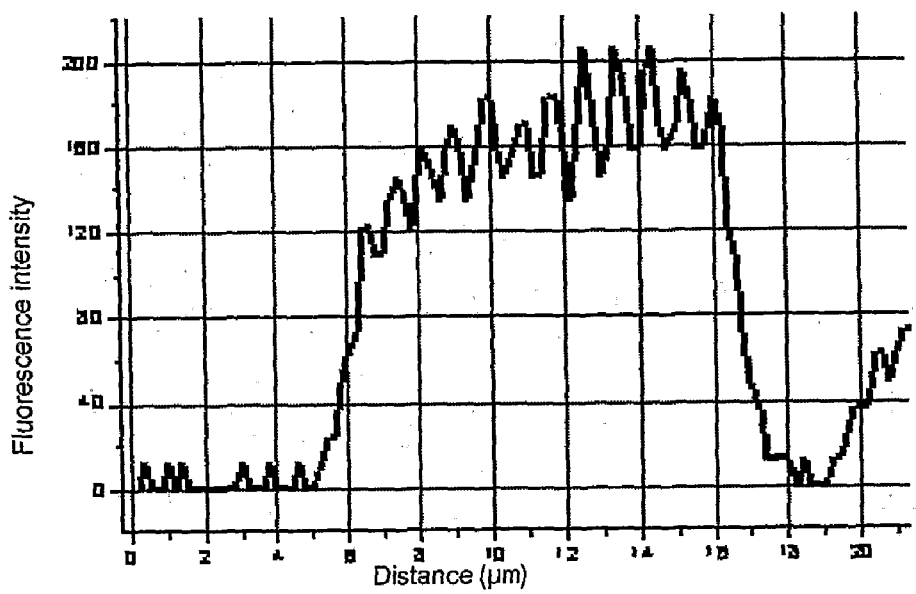
FIG. 10A shows the intensity distribution diagram along a line of fluorescent bead.
FIG. 10B shows the estimated resolution in case of different spatial positions in different depths in the form of a table.

In FIG. 10A a diagram shows the intensity distribution along a line of fluorescent bead in case of an image 59 taken in the single-channel prototype for resolution estimation. The table of FIG. 10B shows the estimated resolution in case of different spatial positions in different depths.

Figure 11:
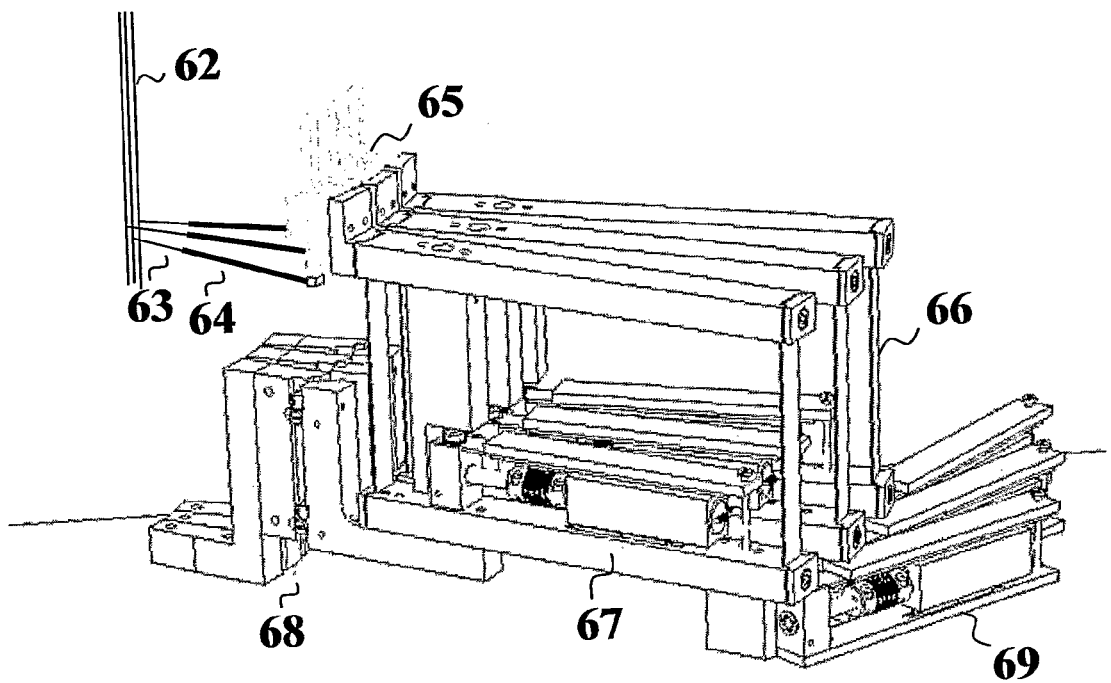
FIG. 11 shows a portion of a manipulator comprising resilient wires for 3D moving the fibers.

In FIG. 11 the upper drawing shows the layout of a sub-micrometer resolution manipulator comprising resilient wires (servo-motors, piezo-actuators) for 3D moving the fibers. Each of the optical fibers 62 are supported by a respective glass fiber 63 fixed to it. These fibers 63 are further fixed to the manipulator through a thicker metal bar. Vertical movement is performed by means of piezo motors 65. Radial movement is performed by means of resilient wires 66 actuated by servo-motors 67. For tangential turning of the manipulators resilient joints 68 also actuated by servo-motors are used.

A real-time, non-linear microscope system has been described which is applicable to perform high-speed measurements and/or photochemical stimulation (with an "image refreshing time" of kHZ order of magnitude) at selected points of a 3D space (in a volume of at least 800 μm×800 μm×200 μm), both in in-vivo and in in-vitro applications. Resolution (appr. 0.6 μm×0.6 μm×1.8 μm or better) approximates the high spatial resolution characteristic of the scanning two-photon absorption fluorescence microscopy, the number of the measuring points is more than two, typically around 100. Optical resolution is at least 0.3 μm at the central portion and at least 0.5 μm at the other regions.

The photonic optical fiber as described above can be a waveguide having a gaseous or vacuum core, or a single-mode large mode area (LMA) optical waveguide fiber in which the core of the optical fiber is made of glass, and the diameter of said core being sufficiently large to keep the non-linear effects on a low level as required, and the numeric aperture of the light emerging from the fiber being sufficiently small for producing diffraction-limited imaging in the specimen.

By use of the 3D microscope measuring system of the invention, physiologic examination of neurons can be performed, wherein fast physiological activity (such as firing) of neurons can be examined and real-time activity patterns can be determined, particularly using a CNN-based computer and/or a DSP-based processor unit.

The invention claimed is:

1. A real-time, 3D, non-linear microscope measuring system for examining a set of microscopic image points in different image planes, said system comprising:
    a bundle of optical fibers or waveguides for marking out the positions of at least two image points to be examined, wherein one optical fiber or waveguide is allocated to each of said image points respectively, and wherein coordinates of said image points are selected by positioning the end of an allocated optical fiber or waveguide in a object area containing a number of object planes;
    an optical switch operably associated with said optical fibers or wave guides being applicable to address said image points to be examined in rapid succession;
    an imaging system positioned between point-like light sources provided by the ends of said optical fibers or waveguides being in an object space and said image points to be examined in an image space, said imaging system being applicable to produce appropriate angular magnification and to establish an unambiguous connection between said point-like light sources and said image points; and
    a light source generating light pulses as examined optical signals where the duration of said pulses is of the order of picoseconds or femtoseconds.

2. The microscope measuring system according to claim 1, wherein said image points to be examined are image points determined by utilizing images produced by means of a conventional 3D scanning non-linear microscope, reference scanner or other microscope.

3. The microscope measuring system according to claim 1, wherein said examining optical signal is a signal inducing two-photon absorption or second harmonic signal.

4. The microscope measuring system according to claim 1, wherein said optical fiber or waveguide is of a single-mode type for maintaining the spatial distribution of femtosecond laser pulses, wherein a dispersing element for stretching said pulses temporally is positioned between said light source and the input of said optical fibers, and a dispersion compensating element for compressing the pulses inversely is positioned after the output of said optical fibers, whereby the time shape of the light pulses is preserved and the non-linear effects are decreased.

5. The microscope measuring system according to claim 1, wherein said optical fiber or waveguide is a photonic crystal single-mode optical fiber maintaining the spatial distribution and time shape of said light pulses.

6. The microscope measuring system according to claim 5, wherein said photonic crystal fiber is a waveguide having a gaseous or vacuum core, or a single-mode large mode area (LMA) optical waveguide fiber in which the core of the optical fiber is made of glass, and the diameter of said core is sufficiently large to keep the non-linear effects on a low level as required, and the numeric aperture of the light emerging from the fiber is sufficiently small for producing diffraction-limited imaging in a specimen.

7. The microscope measuring system according to claim 1, wherein said imaging system comprises two objectives or other lenses is positioned between the output ends of said optical fibers and said image points to be examined.

8. The microscope measuring system according to claim 1, wherein the number of said image points to be examined in the image space is at least five.

9. The microscope measuring system according to claim 1, wherein said image points to be examined in said object space are within a specimen volume of at least 800 μm×800 μm×200 μm, and the optical resolution is at least 0.3 μm at the central portion and at least 0.5 μm in the outer regions.

10. The microscope measuring system according to claim 1, wherein the images of said optical fiber ends are positioned on the basis of an image produced by a 3D scanning microscope used as reference scanner, wherein a laser beam of said reference scanner and a laser beam emerging from the output ends of said optical fibers are collimated by a first lens or microscope objective positioned between the output ends of said optical fibers and said image points to be examined, and are combined by means of a beam splitter positioned before a second lens or microscope objective used for focusing said beams into the specimen.

11. The microscope measuring system according to claim 10, wherein the optical axis of said reference scanner and the optical axis of said microscope of the measuring system are overlapped by means of a beam splitter positioned after the second lens or microscope objective.

12. The microscope measuring system according to claim 10, wherein said beam splitter is a polarizing beam splitter.

13. The microscope measuring system according to claim 1, wherein said optical switch is an electro-optical modulator, galvano-scanner or acousto-optical switch comprising suitable prisms for compensating angular dispersion.

14. The microscope measuring system according to claim 4, wherein said dispersing element positioned before said optical fiber for stretching said pulses temporally is a low-loss stretcher unit comprising at least two prisms or mirrors, and the dispersion compensating element positioned after the output end of said optical fiber for compressing
said pulses inversely is an optical element included in the imaging system and having satisfactorily high material dispersion.

15. The microscope measuring system according to claim 14, wherein said optical element having satisfactorily high material dispersion is a ZnSe block.

16. The microscope measuring system according to claim 10, wherein said reference scanner unit of said system is applicable to scan the points or curved sections determined by these points selected in a given plane for measurements through the shortest possible way.

17. The microscope measuring system according to claim 16, wherein an optical element is positioned for changing the z-plane of scanning parallel with the movement of said reference scanner.

18. The microscope measuring system according to claim 16, further comprising a lens system and an actuator for modifying divergence needed for changing the depth of the z-plane of scanning, or one or more lenses movable parallel with the optical main axis and positioned in the light path of the reference scanner after an optical fiber for modifying the divergence of the beam, thereby changing the z-plane of scanning.

19. The microscope measuring system according to claim 1, wherein a programmably movable beam-offset optical element is installed between said optical fiber ends and said imaging system, such that the images of said optical fiber ends can be offset in order to make scanning of the blind spots between said fiber ends possible.

20. The microscope measuring system according to claim 19 characterized in that said beam-offset optical element comprises one or two moveable or rotatable optically transparent optical glass plates or mirrors.

21. The microscope measuring system according to claim 1, which is capable of producing two- or multi-photon absorption excitation and detecting the fluorescent signal emerging from the excited volume or detecting a second harmonic signal.

22. The microscope measuring system according to claim 1, further comprising a submicron actuator at the level of a specimen for calibrating the coordinate systems of a 2D reference scanner unit and a 3D optical fiber micropositioning system, said actuator being applicable to scan said coordinate systems of scanners in a third coordinate system for calibration by moving two razor blade apertures crossing each other.

23. The microscope measuring system according to claim 22, further comprising a second actuator provided to adjust in xyz directions of movement necessary for 3D moving of said optical fiber ends with a few μm setting accuracy, capable of moving at least 80 optical fibers arranged radially around the range of scanning possible without difficulty.

24. The microscope measuring system according to claim 23, wherein said second actuator contains uncompensated resilient wires providing μm accuracy.

25. The microscope measuring system according to claim 22, wherein said actuators are driven by DC servo-motors.

26. The microscope measuring system according to claim 22, wherein a filament for positioning said optical fiber is fixed to a moving arm and said optical fiber, the diameter of said filament being of the same order of magnitude as the diameter of said optical fiber.

27. The microscope measuring system according to claim 1, being capable of detecting either the radiation transmitted through the specimen or the reflected infrared-radiation.

28. The microscope measuring system according to claim 1, further comprising a DIC (Differential Interference Contrast), phase contrast or other UV, visible or infrared microscope.

29. The microscope measuring system according to claim 1, further comprising beam splitters positioned between said optical fiber ends and said imaging system for multiplying the space available for the ends of said fibers.

30. The microscope measuring system according to claim 1, further comprising a dichroic beam splitter for projecting the light arriving from a specimen and passing through said optical fibers onto a multichannel detector.

31. A method for the physiologic examination of neurons, said method comprising stimulating portions of one or more neurons photochemically or by light only at points selected for examination in a 3D specimen volume by use of the non-linear, 3D microscope measuring system according to claim 1, and measuring physiological parameters of said neurons in real time.

32. The method according to claim 31, wherein the produced electric activity and/or other ion-levels are measured as physiological parameters.

33. The method according to claim 31, wherein stimulation and measurement are performed sequentially at said points to be examined, and input/output functions are determined on the basis of the measurement.

34. The method according to claim 33, wherein said points to be examined are sequentially changed.

35. The method according to claim 31, wherein stimulation and measurement are performed separately.

36. The method according to claim 31, wherein during said method fast physiological activity of neurons is examined and real-time activity patterns are determined for further analyzis.

37. The method according to claim 36, wherein a Cellular Neural Network (CNN)-based computer and/or Digital Signal Processor (DSP)-based processor unit is used for real-time determination of said activity patterns.

38. The method according to claim 31, wherein a number of cells or cell portions are measured and/or stimulated through scanning a calculated optimal path in a given plane by means of a reference scanner.

39. The method according to claim 38, wherein the z-plane of scanning is changed simultaneously with the movement of said reference scanner, whereby spatial scanning path is provided.

40. The method according to claim 37, wherein the 3D channels are set on the basis of the activity pattern measured by said reference scanner.

41. The method according to claim 31, wherein the method is accomplished in-vivo.

42. The method according to claim 31, wherein the method is applied to trace the accommodation and functioning of implantations or to test the effects of pharmaceutical compounds in neuron networks or cells.

43. The method according to claim 31, wherein agonists or antagonists are introduced to the specimen volume simultaneously with said measurements and/or stimulations through a locally installed means.

* * * * *